US012587596B2

(12) United States Patent
Lv

(10) Patent No.: US 12,587,596 B2
(45) Date of Patent: Mar. 24, 2026

(54) ELECTRONIC DEVICE

(71) Applicant: VIVO MOBILE COMMUNICATION CO., LTD., Dongguan (CN)

(72) Inventor: Qiushi Lv, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 711 days.

(21) Appl. No.: 17/954,313

(22) Filed: Sep. 27, 2022

(65) Prior Publication Data

US 2023/0019823 A1 Jan. 19, 2023

Related U.S. Application Data

(63) Continuation of application No. PCT/CN2021/077432, filed on Feb. 23, 2021.

(30) Foreign Application Priority Data

Apr. 1, 2020 (CN) .......................... 202010252992.2

(51) Int. Cl.
*H04M 1/02* (2006.01)

(52) U.S. Cl.
CPC ................................ *H04M 1/0268* (2013.01)

(58) Field of Classification Search
CPC ............. H04M 1/0214; H04M 1/0227; H04M 1/0247; H04M 1/0268; G06F 1/1616; G06F 1/1641; G06F 1/1652
See application file for complete search history.

(56) References Cited

U.S. PATENT DOCUMENTS

2003/0098857 A1 5/2003 Gettemy et al.
2007/0279315 A1* 12/2007 Laves ................. H04M 1/0268
345/1.1
2011/0012931 A1 1/2011 Abe
2012/0033354 A1 2/2012 Huang
(Continued)

FOREIGN PATENT DOCUMENTS

CN 204189088 U 3/2015
CN 105259984 A 1/2016
CN 105516411 A 4/2016
(Continued)

OTHER PUBLICATIONS

Extended European Search Report issued in related European Application No. 21780929.2, mailed Sep. 15, 2023, 10 pages.
(Continued)

*Primary Examiner* — Nguyen T Vo
(74) *Attorney, Agent, or Firm* — IPX PLLC

(57) ABSTRACT

The present disclosure discloses an electronic device, which includes a device housing provided with an accommodation groove and a first display connected to the device housing. The first display is a flexible display having a folded state and an unfolded state, and the first display has a plurality of display sub-regions. In a case that the first display is in the folded state, the first display is accommodated in the accommodation groove, and the plurality of display sub-regions are stacked and distributed in sequence; or in a case that the first display is in the unfolded state, the first display is unfolded out of the accommodation groove, and the plurality of display sub-regions are coplanar.

15 Claims, 9 Drawing Sheets

510

(56)                    References Cited

U.S. PATENT DOCUMENTS

2016/0044803 A1      2/2016  Nakamura
2020/0364020 A1*  11/2020  Jones ................... G06F 3/1431

FOREIGN PATENT DOCUMENTS

| CN | 106444988 A | 2/2017 |
|----|-------------|--------|
| CN | 110399109 A | 11/2019 |
| CN | 110445890 A | 11/2019 |
| CN | 209674772 U | 11/2019 |
| CN | 110580859 A | 12/2019 |
| CN | 111510524 A | 8/2020 |
| WO | 03047219 A1 | 6/2003 |

OTHER PUBLICATIONS

International Search Report issued in corresponding International Application No. PCT/CN2021/077432, mailed Apr. 19, 2021, 5 pages.
First Office Action issued in related Chinese Application No. 202010252992.2, mailed Dec. 3, 2020, 9 pages.

* cited by examiner

120

100        421        110

120                                    300

421            110        100        420        410

400

ELECTRONIC DEVICE

CROSS-REFERENCE TO RELATED APPLICATIONS

This application is a continuation of International Application PCT/CN2021/077432, filed Feb. 23, 2021, which claims priority to Chinese Patent Application No. 202010252992.2, filed Apr. 1, 2020. The entire contents of each of the above-referenced applications are expressly incorporated herein by reference.

TECHNICAL FIELD

The present disclosure relates to the field of communication device technologies, and in particular, to an electronic device.

BACKGROUND

With the increasing of user requirements, the performance of electronic devices is being continuously optimized. In the related art, an increasing number of electronic devices are equipped with large-area displays, thereby forming large-screen electronic devices. The large-screen electronic devices have high display performance, and therefore are increasingly popular with users. However, a large-area display usually results in large overall size of an electronic device, which is not conducive to portability for a user.

Considering portability, foldable electronic devices emerge accordingly. A foldable electronic device enables the electronic device to present a larger-area display in a case that an overall size of the electronic device is determined. However, in a current foldable electronic device, a device housing needs to be designed into a foldable structure, and displays are respectively designed on foldable parts. In this structure, the device housing of the electronic device needs to be adjusted, which usually results in a complex structure of the electronic device.

SUMMARY

The present disclosure discloses an electronic device.

An electronic device includes a device housing and a first display, where the first display is a flexible display, the device housing is provided with an accommodation groove, and the first display is connected to the device housing; and the first display has a folded state and an unfolded state;

the first display has a plurality of display sub-regions; and in a case that the first display is in the folded state, the first display is accommodated in the accommodation groove, and the plurality of display sub-regions are stacked and distributed in sequence; or in a case that the first display is in the unfolded state, the first display is unfolded out of the accommodation groove, and the plurality of display sub-regions are coplanar.

In the electronic device disclosed in the embodiments of the present disclosure, a structure of a conventional electronic device is improved, so that the first display is a flexible display and has a plurality of display sub-regions that can be stacked and unfolded relative to each other. In this way, the first display can be folded in the accommodation groove of the device housing in the folded state and unfolded out of the accommodation groove in the unfolded state, so that the plurality of display sub-regions are finally coplanar to form a large-area display screen. In the electronic device disclosed in the embodiments of the present disclosure, the device housing does not need to be designed into a foldable structure, but only the first display needs to be designed into a foldable structure. Therefore, the structural complexity of the electronic device can be reduced.

BRIEF DESCRIPTION OF DRAWINGS

The accompanying drawings described herein are intended for a better understanding of the present disclosure and constitute a part of the present disclosure. Example embodiments of the present disclosure and descriptions thereof are intended to explain the present disclosure, but do not constitute any inappropriate limitation on the present disclosure. In the accompanying drawings.

Figure 1:
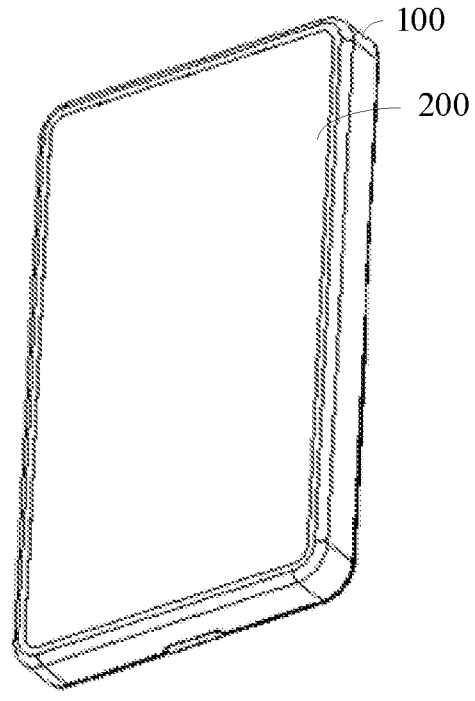
FIG. 1 to FIG. 3 are schematic structural diagrams of an electronic device disclosed in an embodiment of the present disclosure when a first display is in a folded state.
Figure 2:
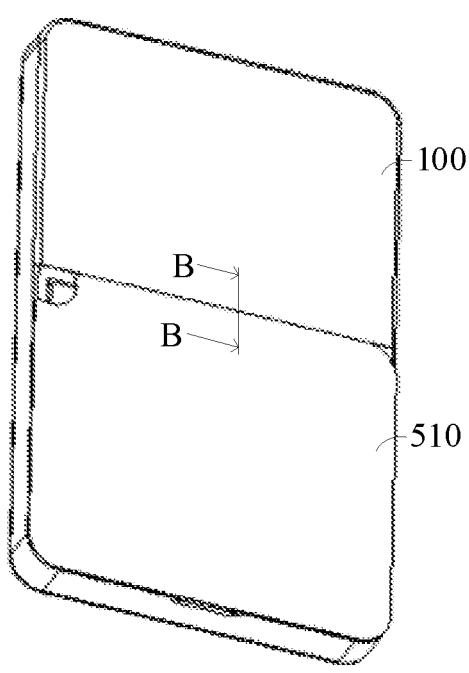
Figure 3:
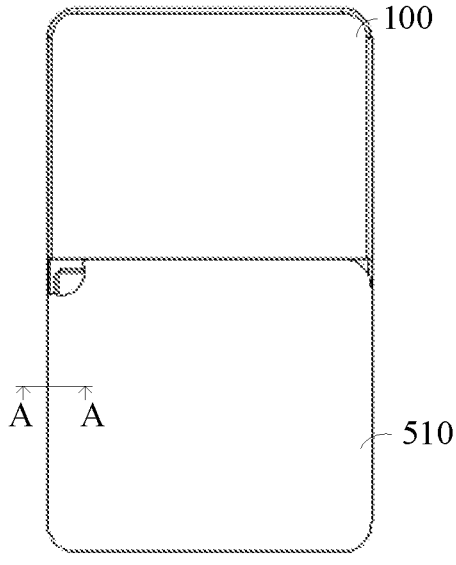
Figure 4:
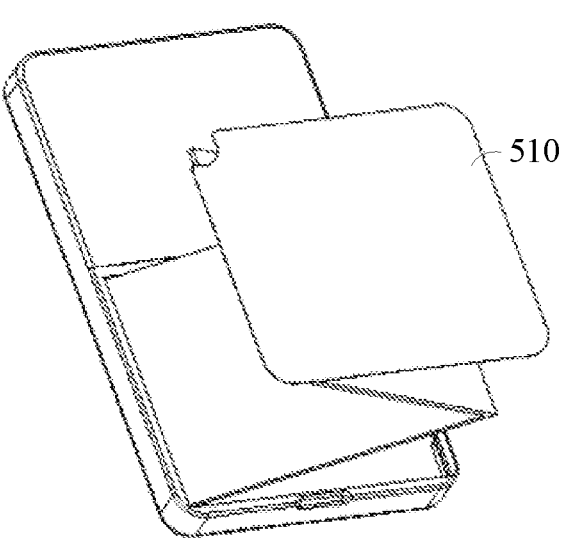
FIG. 4 is a schematic structural diagram of an electronic device disclosed in an embodiment of the present disclosure when a first display is partially unfolded.
Figure 5:
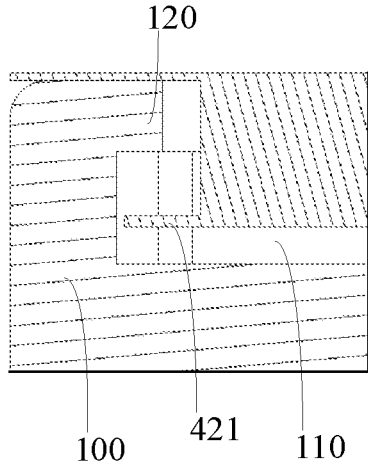
FIG. 5 is a partial cross-sectional view of FIG. 3 along an A-A direction.
Figure 6:
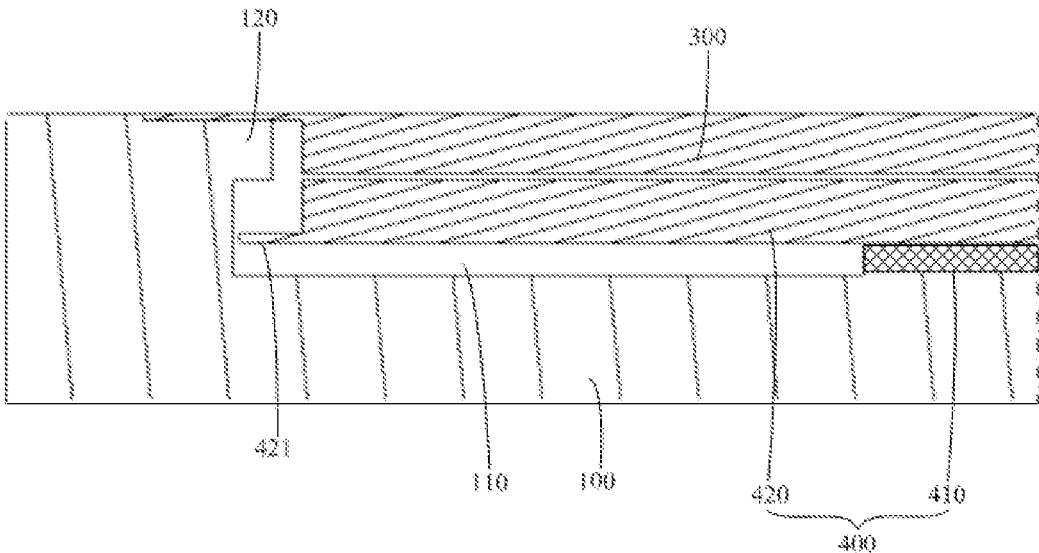
FIG. 6 is a cross-sectional view of an electronic device disclosed in an embodiment of the present disclosure along a B-B direction.
Figure 7:
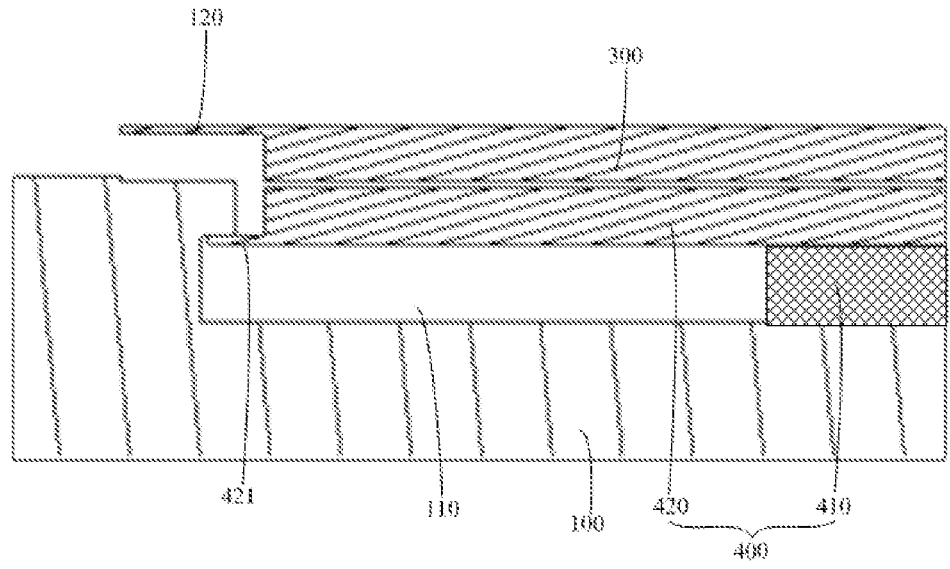
FIG. 7 is a schematic diagram of FIG. 6 when a first display protrudes out of an opening of an accommodation groove.
Figure 8:
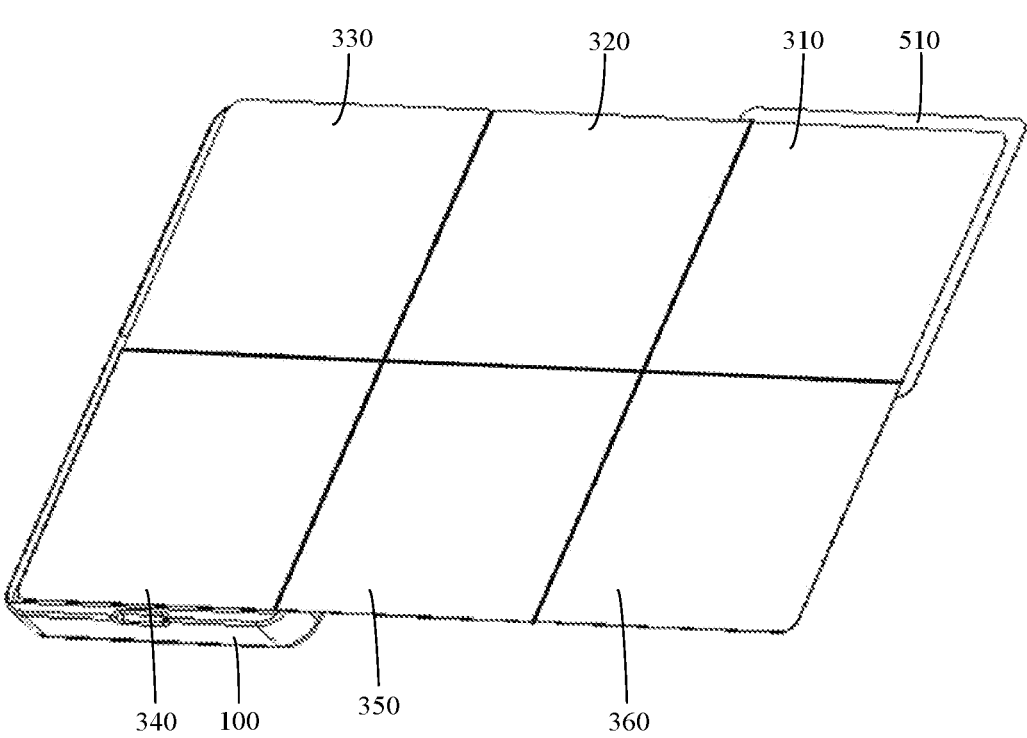
FIG. 8 and FIG. 9 are schematic structural diagrams of an electronic device disclosed in an embodiment of the present disclosure when a first display is in an unfolded state.
Figure 9:
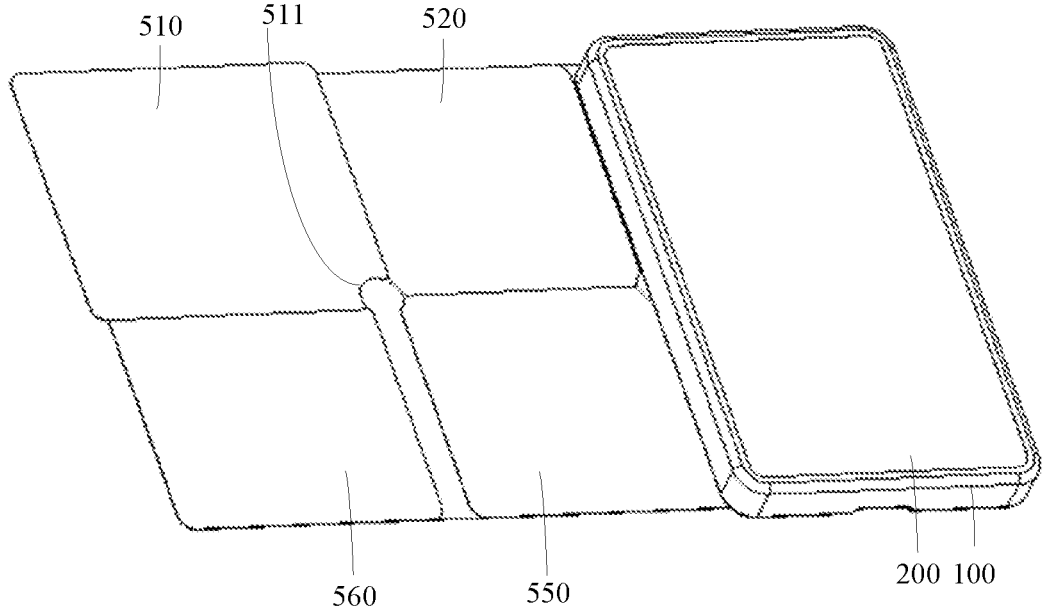
Figure 10:
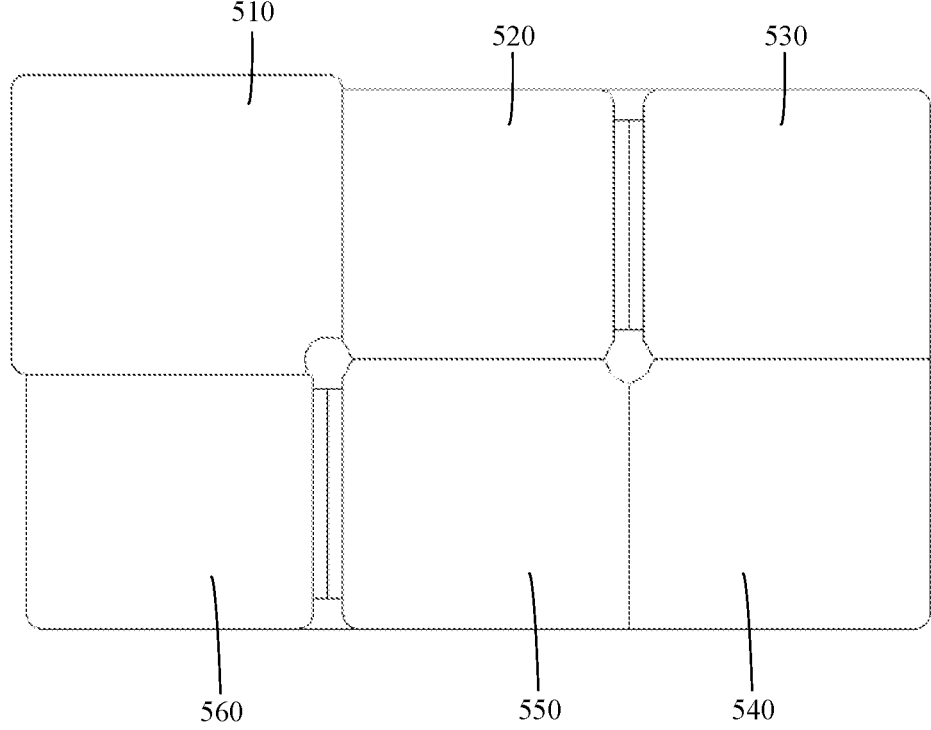
FIG. 10 and FIG. 11 are schematic structural diagrams of a partial structure of an electronic device disclosed in an embodiment of the present disclosure at different angles of view when a first display is in an unfolded state.
Figure 11:
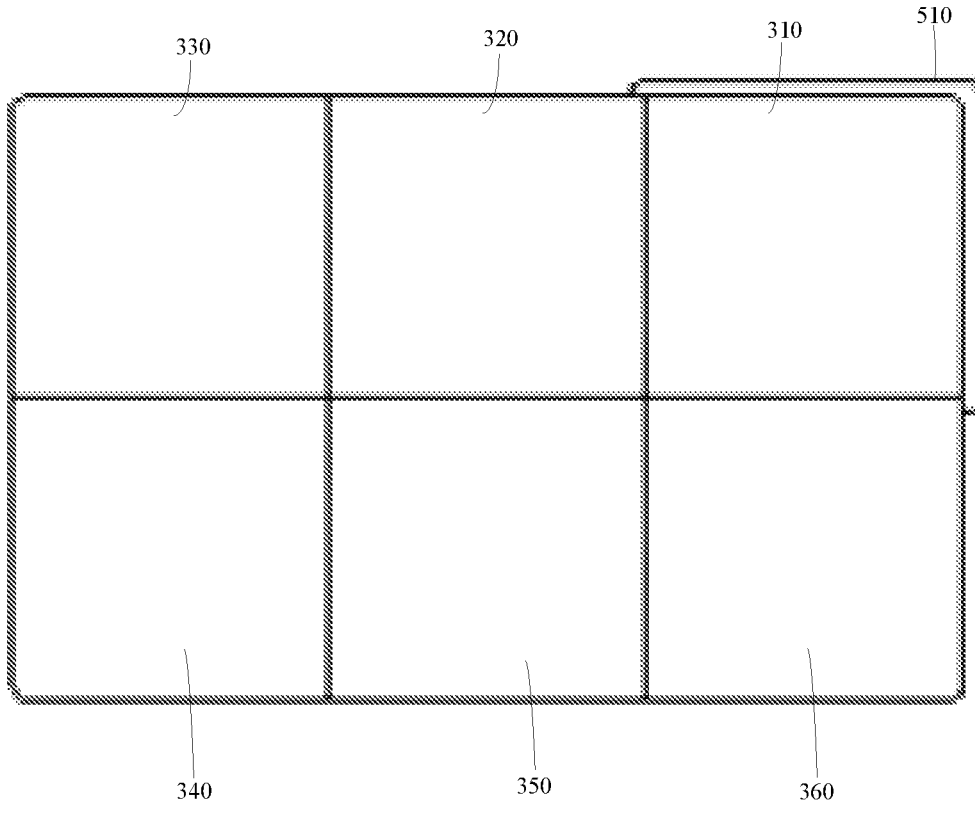

Reference signs in the accompanying drawings are described as follows:

100: device housing, 110: accommodation groove, and 120: first limiting part; 200: second display;

300: first display, 310: display sub-region, 320: display sub-region, 330: display sub-region, 340: display sub-region, 350: display sub-region, 360: display sub-region, 300a: first display sub-region, 300b: second display sub-region, 300c: third display sub-region, 300d: fourth display sub-region, and 300e: second rotating shaft;

400: ejection mechanism, 410: elastic body, 420: supporting part, and 421: second limiting part; and 510: supporting plate, 511: folding avoidance notch, 520: supporting plate, 530: supporting plate, 540: supporting plate, 550: supporting plate, and 560: supporting plate.

DETAILED DESCRIPTION

To make the objectives, technical solutions, and advantages of the present disclosure clearer, the following clearly describes the technical solutions of the present disclosure with reference to specific embodiments of the present disclosure and corresponding drawings. Apparently, the described embodiments are merely some of but not all the embodiments of the present disclosure. All other embodiments obtained by a person of ordinary skill in the art based on the embodiments of the present disclosure without creative efforts shall fall within the protection scope of the present disclosure.

The technical solutions disclosed in the embodiments of the present disclosure are described in detail below with reference to the accompanying drawings.

Referring to FIG. 1 to FIG. 11, an embodiment of the present disclosure discloses an electronic device. The disclosed electronic device includes a device housing 100 and a first display 300.

The device housing 100 is a base component of the electronic device, and the device housing 100 can provide a base for mounting other components of the electronic device. The device housing 100 is provided with an accommodation groove 110, and the accommodation groove 110 is used for accommodating the first display 300.

In this embodiment of the present disclosure, the first display 300 is connected to the device housing 100. The first display 300 is a flexible display, and the first display 300 has a plurality of display sub-regions. The flexible display can change between different states through deformation. In some embodiments, the first display 300 has a folded state and an unfolded state.

In a case that the first display 300 is in the folded state, the first display 300 is accommodated in the accommodation groove 110, and the plurality of display sub-regions are stacked and distributed in sequence. After the plurality of display sub-regions are stacked, the first display 300 is folded into a smaller area, thereby implementing arrangement in the accommodation groove 110.

In a case that the first display 300 is in the unfolded state, the first display 300 is unfolded out of the accommodation groove 110, and the plurality of display sub-regions are coplanar to finally form a large-area display screen.

In the electronic device disclosed in this embodiment of the present disclosure, a structure of a conventional electronic device is improved, so that the first display 300 is a flexible display and has a plurality of display sub-regions that can be stacked and unfolded relative to each other. In this way, the first display 300 can be folded in the accommodation groove 110 of the device housing 100 in the folded state and unfolded out of the accommodation groove 110 in the unfolded state, so that the plurality of display sub-regions are finally coplanar to form a large-area display screen. In the electronic device disclosed in this embodiment of the present disclosure, the device housing 100 does not need to be designed into a foldable structure, but only the first display 300 needs to be designed into a foldable structure. Therefore, the structural complexity of the electronic device can be reduced.

In a further technical solution, the electronic device disclosed in this embodiment of the present disclosure may further include a second display 200, where the second display 200 may be disposed on a first side of the device housing 100, and the first display 300 is disposed on a second side of the device housing 100. In this case, the electronic device is equipped with the second display 200, and the second display 200 is disposed on the second side of the device housing 100, so that a display area of the electronic device can be further increased, thereby further facilitating use by a user. In some embodiments, the first side and the second side may be back to back, or may be adjacent to each other, and a specific positional relationship between the first side and the second side is not limited in this embodiment of the present disclosure.

To facilitate unfolding of the first display 300, in an exemplary solution, the electronic device disclosed in this embodiment of the present disclosure may further include an ejection mechanism 400, and the ejection mechanism 400 is disposed in the accommodation groove 110. The first display 300 may be movably connected to the device housing 100 through the ejection mechanism 400. In a case that the first display 300 is in the folded state, the ejection mechanism 400 may drive the first display 300 to at least partially protrude out of the accommodation groove 110. In this case, the ejection mechanism 400 may first drive the first display 300 in the folded state to protrude out of the accommodation groove 110 from the accommodation groove 110, and then the first display 300 is unfolded. The design of the ejection mechanism 400 can facilitate an unfolding operation by a user.

In this embodiment of the present disclosure, there may be a plurality of types of ejection mechanisms 400. In an exemplary solution, the ejection mechanism 400 may include an elastic body 410 and a supporting part 420. The elastic body 410 is disposed between a bottom wall of the accommodation groove 110 and the supporting part 420. The first display 300 is located on the supporting part 420 and is further supported by the supporting part 420. In a specific ejection process, the ejection mechanism 400 may apply a driving force to the supporting part 420 based on the bottom wall of the accommodation groove 110, and then push the supporting part 420 to push the first display 300 out of the accommodation groove 110. The supporting part 420 may be a plate-shaped supporting structure, so that a good supporting effect can be achieved. There may be a plurality of types of elastic bodies 410. For example, the elastic body 410 may be a telescopic spring, a rubber elastic block, or the like fixed on the bottom wall of the accommodation groove 110. A specific type of the elastic body 410 is not limited in this embodiment of the present disclosure.

In a further technical solution, in the electronic device disclosed in this embodiment of the present disclosure, the accommodation groove 110 may be provided with a first limiting part 120, the supporting part 420 is provided with a second limiting part 421, and the first limiting part 120 and the second limiting part 421 are fit in a limiting manner along a direction of an opening of the accommodation groove 110. In a process of pushing out the first display 300 by the ejection mechanism 400, the second limiting part 421 moves until it is at a position to be fit with the first limiting part 120 in a limiting manner, thereby finally avoiding excessive ejection.

In some embodiments, the first limiting part 120 and the second limiting part 421 may have a plurality of types of structures. In an exemplary solution, the first limiting part 120 may be a first limiting protrusion disposed at an edge of the opening of the accommodation groove 110, and the second limiting part 421 may be a second limiting protrusion disposed at an edge of the supporting part 420. In an ejection process of the ejection mechanism 400, the first limiting protrusion and the second limiting protrusion are fit in a limiting manner along the direction of the opening of the accommodation groove 110. The first limiting part 120 and the second limiting part 421 may be magnetic parts with a same polarity. In the ejection process of the ejection mechanism 400, the first limiting part 120 and the second limiting part 421 magnetically repel each other, thereby limiting excessive protrusion of the ejection mechanism 400.

To facilitate folding of the first display 300, a folding guide structure may be disposed between two adjacent display sub-regions, and the folding guide structure may be a crease structure, a hinge structure, a one-way shaft, or the like. The folding guide structure can perform a guiding function during folding of the first display 300, so that the first display 300 can be folded along a specific direction, thereby finally facilitating an operation by a user and avoiding reverse mis-folding.

As described above, the first display 300 is a flexible display, and the flexible display has poor strength. To ensure that the plurality of display sub-regions are coplanar after the first display 300 is unfolded which can achieve a good display effect, in an exemplary solution, the electronic device disclosed in this embodiment of the present disclosure may further include a plurality of supporting plates. The number of supporting plates may be equal to the number of display sub-regions. Each display sub-region is supported by one supporting plate. There is a gap between two adjacent supporting plates, and the gap is opposite a folding guide structure between two corresponding display sub-regions. In this case, in a case that the first display 300 is in the unfolded state, each supporting plate can support a corresponding display sub-region, thereby finally improving a display effect of the first display 300. In addition, there is a gap between two adjacent supporting plates, and the gap is opposite a corresponding folding guide structure, thereby ensuring that the first display 300 avoids the folding guide structure during a folding process and finally can be folded.

In an implementation, the plurality of display sub-regions may include a display sub-region 310, a display sub-region 320, a display sub-region 330, a display sub-region 340, a display sub-region 350, and a display sub-region 360. Correspondingly, the plurality of supporting plates may include a supporting plate 510, a supporting plate 520, a supporting plate 530, a supporting plate 540, a supporting plate 550, and a supporting plate 560.

In this embodiment of the present disclosure, to perform a supporting function, the supporting plate is a rigid plate. Each supporting plate may be attached to a rear side of a display screen of a corresponding display sub-region. In an exemplary solution, a shape of the supporting plate may adapt to a shape of the display sub-region. In some embodiments, the display sub-region may be a square region or of another shape, and a specific shape of the display sub-region is not limited in this embodiment of the present disclosure.

To facilitate folding of the supporting plate along with each display sub-region, in an exemplary solution, a corner of the supporting plate may be provided with a folding avoidance notch 511. In some embodiments, a part of an edge, of the supporting plate, on which the folding avoidance notch 511 is formed may be an arc edge. A specific shape of the folding avoidance notch 511 is not limited in this embodiment of the present disclosure.

To facilitate folding, in a case that the first display 300 is in the folded state, the plurality of display sub-regions and the plurality of supporting plates may be alternately stacked. In this case, the plurality of supporting plates can be folded along with the folding of the plurality of display sub-regions, thereby facilitating a folding operation by a user.

In this embodiment of the present disclosure, the first display 300 may have a first display sub-region and a second display sub-region that are adjacently distributed, and the plurality of supporting plates may include a first supporting plate and a second supporting plate, where the first supporting plate is opposite the first display sub-region, the second supporting plate is opposite the second display sub-region, a first rotating shaft may be disposed between the first supporting plate and the second supporting plate, and the first supporting plate and the second supporting plate are rotatably connected through the first rotating shaft. In this case, two adjacent supporting plates of the plurality of supporting plates can be rotatably fit through the first rotating shaft, so that the plurality of supporting plates form a structure with high folding flexibility, thereby facilitating folding along with the first display 300.

In an exemplary solution, the plurality of supporting plates may include a third supporting plate, and in a case that the first display 300 is in the folded state, the third supporting plate is connected to the device housing 100 and covers the opening of the accommodation groove 110. The first display 300 is located in a space formed by the third supporting plate and the accommodation groove 110. In this case, the third supporting plate can protect the first display 300 in the folded state. In a further technical solution, the third supporting plate can be more stably fit with the edge of the opening of the accommodation groove 110 through a magnetic attraction structure to prevent the accommodation groove 110 from being easily opened by mistake.

In another exemplary solution, in a case that the first display 300 is in the folded state, at least one display sub-region can be exposed through the opening of the accommodation groove 110, so that the first display 300 can also be at least partially exposed in the folded state.

In a further technical solution, in a case that the first display 300 is in the folded state, an outer surface of the third supporting plate is coplanar with an outer surface of the device housing 100, thereby improving the appearance of the electronic device.

In an exemplary solution, in a case that the first display 300 is in the folded state, the third supporting plate and the device housing 100 may be fixed through clamping or magnetic attraction, so that the third supporting plate is in a stable state and can more stably form a space for accommodating the first display 300 in the folded state.

To facilitate an unfolding operation by a user on the first display 300, in a further technical solution, an edge of the third supporting plate may include a handle portion, and the handle portion may protrude from or be recessed on the outer surface of the device housing 100. In a specific manipulation process, the user may manipulate the handle portion to unfold the first display 300.

In an exemplary solution, in a case that the first display 300 is in the folded state, the third supporting plate and a surface on which the opening of the accommodation groove 110 is located can be fit in a limiting manner. In some embodiments, the third supporting plate and the surface on which the opening of the accommodation groove 110 is located are fit in a limiting manner along a direction toward the bottom wall of the accommodation groove 110 to prevent the third supporting plate from collapsing in the accommodation groove 110, thereby well guaranteeing the overall appearance of the electronic device after the first display 300 is folded.

To improve an unfolding effect of the first display 300, in an exemplary solution, the display sub-regions may include magnetic edges, and in a case that the first display 300 is in the unfolded state, two adjacent display sub-regions are connected in a limiting manner through opposite magnetic edges, thereby further improving the stability of unfolding of the first display 300. In some embodiments, one of two adjacent display sub-regions may include a first magnetic edge, and the other one may include a second magnetic edge, where the first magnetic edge and the second magnetic edge are magnetically attracted when the first display 300 is in the unfolded state, thereby improving an unfolding effect of the two adjacent display sub-regions and structural stability after unfolding.

In this embodiment of the present disclosure, in the first display 300, two adjacent display sub-regions of the plurality of display sub-regions may be connected through a second rotating shaft. In some embodiments, the second rotating shaft may be parallel to a plane on which the display sub-regions are located, so that the two adjacent display sub-regions switch between a folded state and an unfolded state through folding. The first display 300 disclosed in this embodiment of the present disclosure may be folded in a plurality of manners. For example, the first display 300 may form a folded structure through Miura folding.

In another exemplary solution, an axis of the second rotating shaft may be perpendicular to the plane on which the display sub-regions are located. In this case, the display sub-regions may switch between the folded state and the unfolded state through horizontal rotation. In the foregoing manner of connecting two adjacent display sub-regions through the second rotating shaft, the first display 300 can be unfolded or folded more easily.

Figure 12:
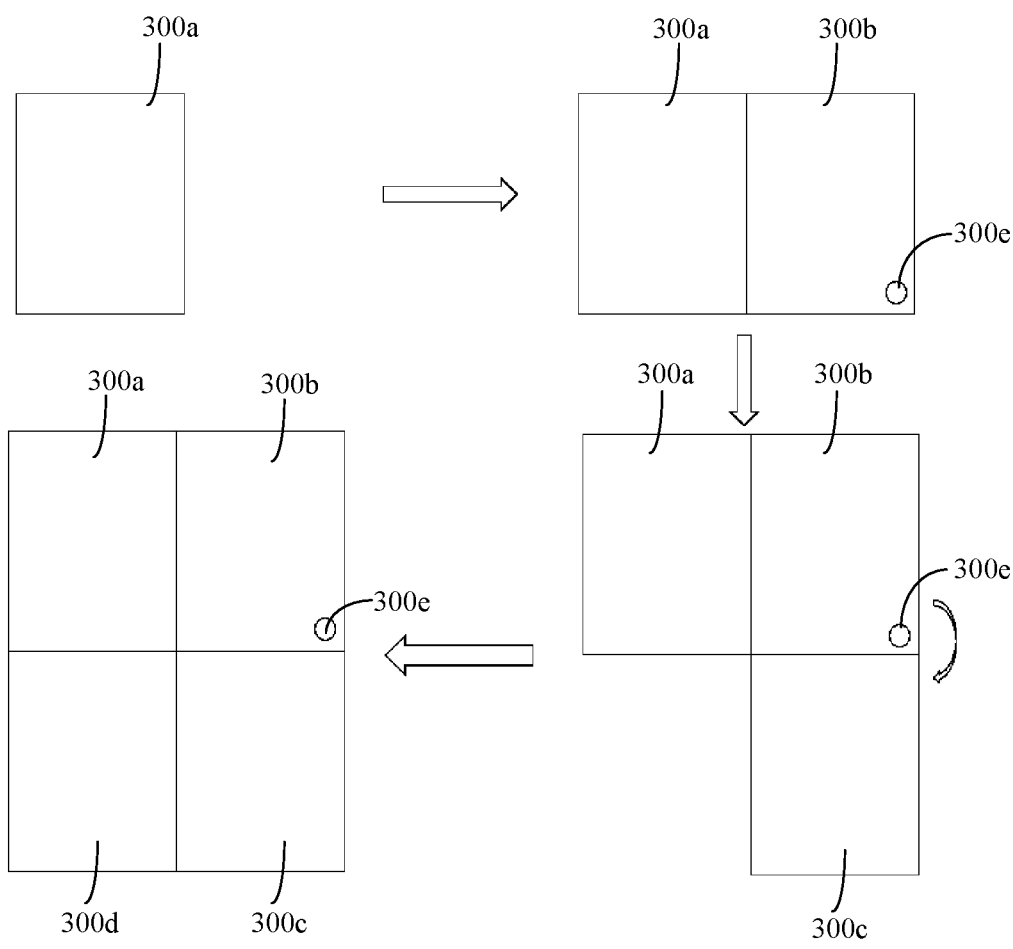
FIG. 12 is a schematic diagram of another unfolding process of a first display disclosed in an embodiment of the present disclosure.

The plurality of display sub-regions may be folded or unfolded in a manner of combining folding and horizontal rotation. FIG. 12 is a schematic diagram of an unfolding process of another first display 300 disclosed in an embodiment of the present disclosure. In some embodiments, a plurality of display sub-regions include a first display sub-region 300a, a second display sub-region 300b, a third display sub-region 300c, and a fourth display sub-region 300d. The second display sub-region 300b and the first display sub-region 300a are rotatably connected or slidably fit through a first rotating shaft, so that an entirety formed by the second display sub-region 300b, the third display sub-region 300c, and the fourth display sub-region 300d can be folded or slide relative to the first display sub-region 300a, thereby partially opening the first display 300. The second display sub-region 300b and the third display sub-region 300c may be rotatably fit through a second rotating shaft 300e, a rotation axis of the second rotating shaft 300e is perpendicular to the third display sub-region 300c, and the fourth display sub-region 300d is connected to the third display sub-region 300c. In this case, an entirety formed by the third display sub-region 300c and the fourth display sub-region 300d can horizontally rotate as a whole, thereby unfolding the third display sub-region 300c.

The fourth display sub-region 300d and the third display sub-region 300c may be rotatably connected or slidably fit through another first rotating shaft, so that the fourth display sub-region 300d can be folded or slide relative to the third display sub-region 300c, thereby finally unfolding the fourth display sub-region 300d.

The display sub-regions of the first display 300 may be unfolded or folded through at least one manner of folding, horizontal rotation, and sliding.

In this embodiment of the present disclosure, the plurality of display sub-regions included in the first display 300 may be the same in shape or different shapes. In an exemplary solution, the plurality of display sub-regions are the same in shape, so that a regular folded structure can be formed in a case that the first display 300 is in a folded state, thereby facilitating accommodation in the accommodation groove 110.

The electronic device disclosed in the embodiments of the present disclosure may be a mobile phone, a tablet computer, an e-book reader, a game console, a wearable device (for example, a smart watch), or the like. A specific type of the electronic device is not limited in the embodiments of the present disclosure.

The foregoing embodiments of the present disclosure focus on the differences between the embodiments. Different optimization features of the embodiments can be combined to form other embodiments provided that they are not contradictory. For brevity of description, details are not described herein.

The foregoing descriptions are merely embodiments of the present disclosure, but are not intended to limit the present disclosure. For a person skilled in the art, the present disclosure may have various changes and variations. Any modification, equivalent replacement, or improvement made within the spirit and principle of the present disclosure shall fall within the protection scope of the claims of the present disclosure.

What is claimed is:

1. An electronic device, comprising:
   a device housing provided with an accommodation groove;
   a first display connected to the device housing, the first display being a flexible display and comprising a plurality of display sub-regions, wherein the first display has a folded state and an unfolded state, wherein:
      when the first display is in the folded state, the first display is accommodated in the accommodation groove, and the plurality of display sub-regions are stacked and distributed in sequence; and
      when the first display is changed from the folded state to the unfolded state, the first display is unfolded out of the accommodation groove, and the plurality of display sub-regions are coplanar; and
   an ejection mechanism, wherein the ejection mechanism is disposed in the accommodation groove, and the first display is movably connected to the device housing through the ejection mechanism,
   wherein when the first display is in the folded state, the ejection mechanism drives the first display to at least partially protrude out of the accommodation groove, and
   wherein the ejection mechanism comprises an elastic body and a supporting part, the elastic body is disposed between a bottom wall of the accommodation groove and the supporting part, and the first display is located on the supporting part.

2. The electronic device according to claim 1, wherein the electronic device further comprises a second display, the second display is disposed on a first side of the device housing, and the first display is disposed on a second side of the device housing.

3. The electronic device according to claim 2, wherein the first side and the second side are back to back, or the first side and the second side are adjacent to each other.

4. The electronic device according to claim 1, wherein the accommodation groove is provided with a first limiting part, the supporting part is provided with a second limiting part, and the first limiting part and the second limiting part are fit in a limiting manner along a direction of an opening of the accommodation groove.

5. The electronic device according to claim 4, wherein the first limiting part is a first limiting protrusion disposed at an edge of the opening of the accommodation groove, and the second limiting part is a second limiting protrusion disposed at an edge of the supporting part.

6. The electronic device according to claim 1, further comprising a folding guide structure disposed between two adjacent display sub-regions.

7. The electronic device according to claim 6, wherein the electronic device further comprises a plurality of supporting plates, the number of the supporting plates is equal to the number of the display sub-regions, each of the display sub-regions is supported by one of the supporting plates, there is a gap between two adjacent supporting plates, and the gap is opposite a folding guide structure between two corresponding display sub-regions.

8. The electronic device according to claim 7, wherein the display sub-region is a square region, a shape of the supporting plate adapts to the shape of the display sub-region, and a corner of the supporting plate is provided with a folding avoidance notch.

9. The electronic device according to claim 7, wherein the first display has a first display sub-region and a second display sub-region that are adjacently distributed, the plurality of supporting plates comprise a first supporting plate opposite the first display sub-region and a second supporting plate opposite the second display sub-region, a first rotating shaft is disposed between the first supporting plate and the second supporting plate, and the first supporting plate and the second supporting plate are rotatably connected through the first rotating shaft.

10. The electronic device according to claim 7, wherein the plurality of supporting plates comprise a third supporting plate, and when the first display is in the folded state, the third supporting plate is connected to the device housing and covers an opening of the accommodation groove, and the first display is located in a space formed by the third supporting plate and the accommodation groove.

11. The electronic device according to claim 10, wherein when the first display is in the folded state, an outer surface of the third supporting plate is coplanar with an outer surface of the device housing.

12. The electronic device according to claim 10, wherein when the first display is in the folded state, an edge of the third supporting plate and a surface on which the opening of the accommodation groove is located are fit in a limiting manner.

13. The electronic device according to claim 1, wherein the display sub-regions comprise magnetic edges, and when the first display is changed from the folded state to the unfolded state, two adjacent display sub-regions are connected in a limiting manner through opposite magnetic edges.

14. The electronic device according to claim 1, wherein the plurality of display sub-regions comprise two adjacent display sub-regions that are connected through a second rotating shaft.

15. The electronic device according to claim 1, wherein the plurality of display sub-regions are the same in shape.

* * * * *